US012587950B2

(12) United States Patent
Bravo et al.

(10) Patent No.: US 12,587,950 B2
(45) Date of Patent: Mar. 24, 2026

(54) SECURE NETWORK IDENTIFICATION FOR ACTIVE SCANNING DEVICE

(71) Applicant: Kyndryl, Inc., New York, NY (US)

(72) Inventors: Cesar Bravo, Heredia (CR); David Alonso Campos Batista, Heredia (CR)

(73) Assignee: Kyndryl, Inc., New York, NY (US)

( * ) Notice: Subject to any disclaimer, the term of this patent is extended or adjusted under 35 U.S.C. 154(b) by 486 days.

(21) Appl. No.: 18/130,102

(22) Filed: Apr. 3, 2023

(65) Prior Publication Data

US 2024/0334313 A1 Oct. 3, 2024

(51) Int. Cl.
*H04W 4/00* (2018.01)
*H04W 48/14* (2009.01)
*H04W 48/16* (2009.01)

(52) U.S. Cl.
CPC ........... *H04W 48/14* (2013.01); *H04W 48/16* (2013.01)

(58) Field of Classification Search
CPC .............................. H04W 48/14; H04W 48/16
USPC ......................................................... 370/328
See application file for complete search history.

(56) References Cited

U.S. PATENT DOCUMENTS

| | | | | |
|---|---|---|---|---|
| 2014/0337950 A1* | 11/2014 | Yang | ..................... | H04L 9/3297 726/7 |
| 2016/0219050 A1* | 7/2016 | Zou | ....................... | H04W 12/04 |

400

| | | | |
|---|---|---|---|
| 2016/0255661 A1 | 9/2016 | Siraj et al. | |
| 2021/0007159 A1 | 1/2021 | Jain | |
| 2021/0337463 A1 | 10/2021 | Ong | |
| 2022/0070762 A1 | 3/2022 | Nuvvula | |
| 2022/0330136 A1* | 10/2022 | Siraj | ..................... H04W 48/12 |

FOREIGN PATENT DOCUMENTS

CN 105472640 A 4/2016

OTHER PUBLICATIONS

Anonymous, "Salt (cryptography)", Wikipedia, URL: https://en.wikipedia.org/wiki/Salt_(cryptography), Retrieved: Jul. 12, 2024, 3 pages.
Arias, "Adding Salt to Hashing: A Better Way to Store Passwords", URL: https://auth0.com/blog/adding-salt-to-hashing-a-better-way-to-store-passwords/, Feb. 25, 2021, 23 pages.
Chou, "Characterizing Wi-Fi Network Discovery", Ku Leuven, 2016-2017, 68 pages.
Fleishman, "What the new iOS 13 Wi-Fi message means about nearby available networks", MacWorld, Dec. 3, 2019, 7 pages.

(Continued)

*Primary Examiner* — Temica M Beamer
(74) *Attorney, Agent, or Firm* — CANTOR COLBURN LLP; Erik Swanson

(57) ABSTRACT

An example operation may include one or more of storing a hash of a service set identifier (SSID) of a wireless network via an apparatus, receiving a probe request message transmitted from a network device, wherein the probe request message comprises a hash value, determining that the hash value within the probe request is a valid SSID based on the hash of the SSID of the wireless network stored in the storage device, and controlling the network interface to transmit a probe response with a plain text name of the SSID to the network device in response to the determination.

15 Claims, 11 Drawing Sheets

(56) References Cited

OTHER PUBLICATIONS

Hughes, "Encryption vs. Hashing vs. Salting—What's the Difference?", URL: https://www.pingidentity.com/en/resources/blog/post/encryption-vs-hashing-vs-salting.html, Mar. 1, 2022, 4 pages.

Byte, Track Devices via Probe Frames with Probe quest, [Tutorial], Link: https://www.youtube.com/watch?=Z8RHMUSYTiA, 2019, last downloaded Sep. 2022.

Han et al., Preventing Wi-Fi Privacy Leakage: A User Behavioral Similarity Approach May 20, 2018, https://ieeexplore.ieee.org/document/8422764.

Oliveira et al., Mobile Device Detection Through WiFi Probe Request Analysis, Special Section on Data Mining for Internet of Things, IEEE Access, Jun. 27, 2019.

Sun et al., Mobile Device Passive Localization Based on IEEE 802.11 Probe Request Frames, Mobile Information Systems, vol. 2017, Jun. 19, 2019.

Yeoh et al., Implementing 802.11 Probe Request Scanner Using WARP Platform, Dec. 1, 2014, https://ieeexplore.ieee.org/abstract/document/7024474.

* cited by examiner

Figure 1:
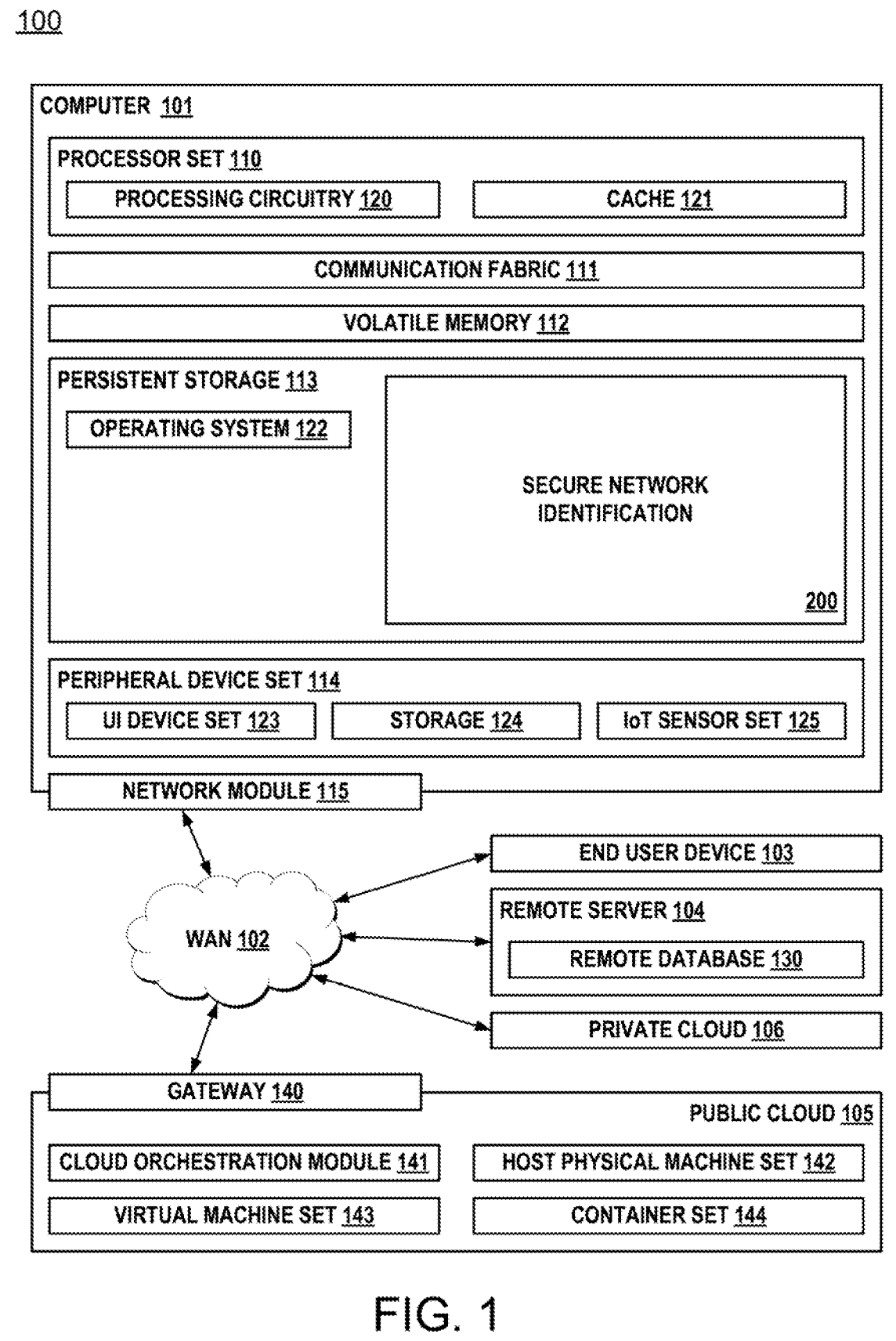

100

COMPUTER 101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122

SECURE NETWORK
IDENTIFICATION

200

PERIPHERAL DEVICE SET 114

UI DEVICE SET 123     STORAGE 124     IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141     HOST PHYSICAL MACHINE SET 142

VIRTUAL MACHINE SET 143     CONTAINER SET 144

370
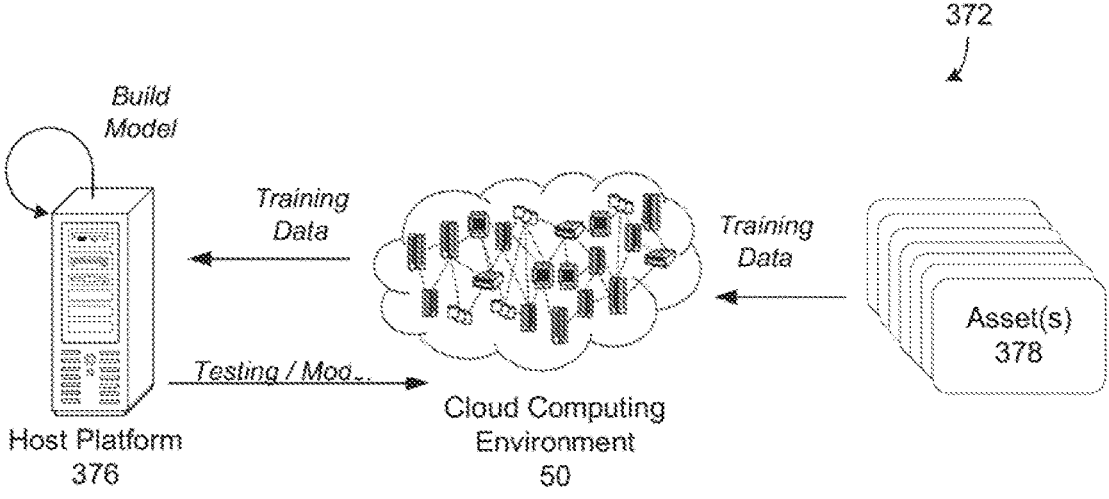
372
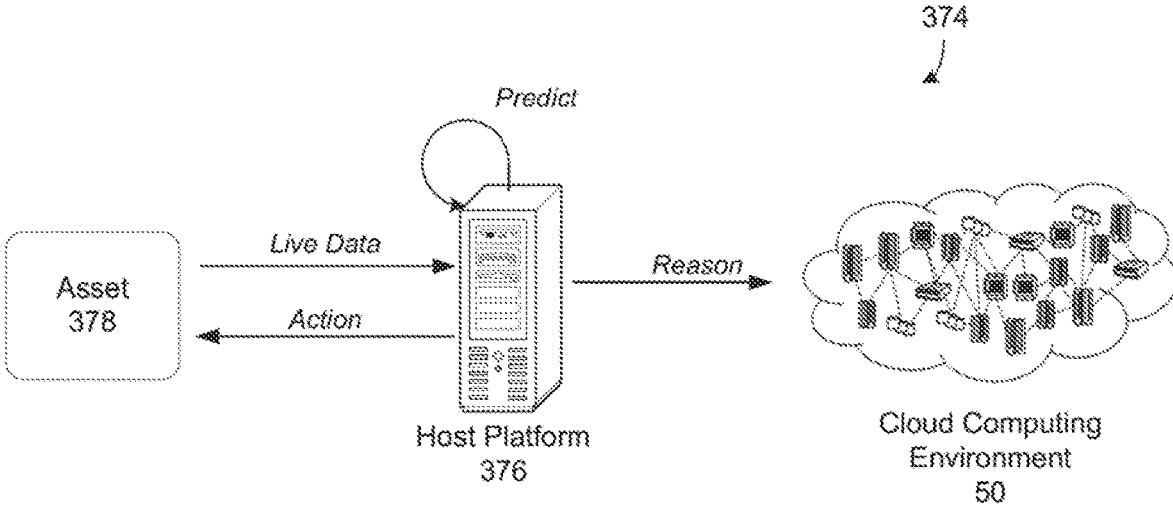
374
FIG. 3D

380

400                    FIG. 4A
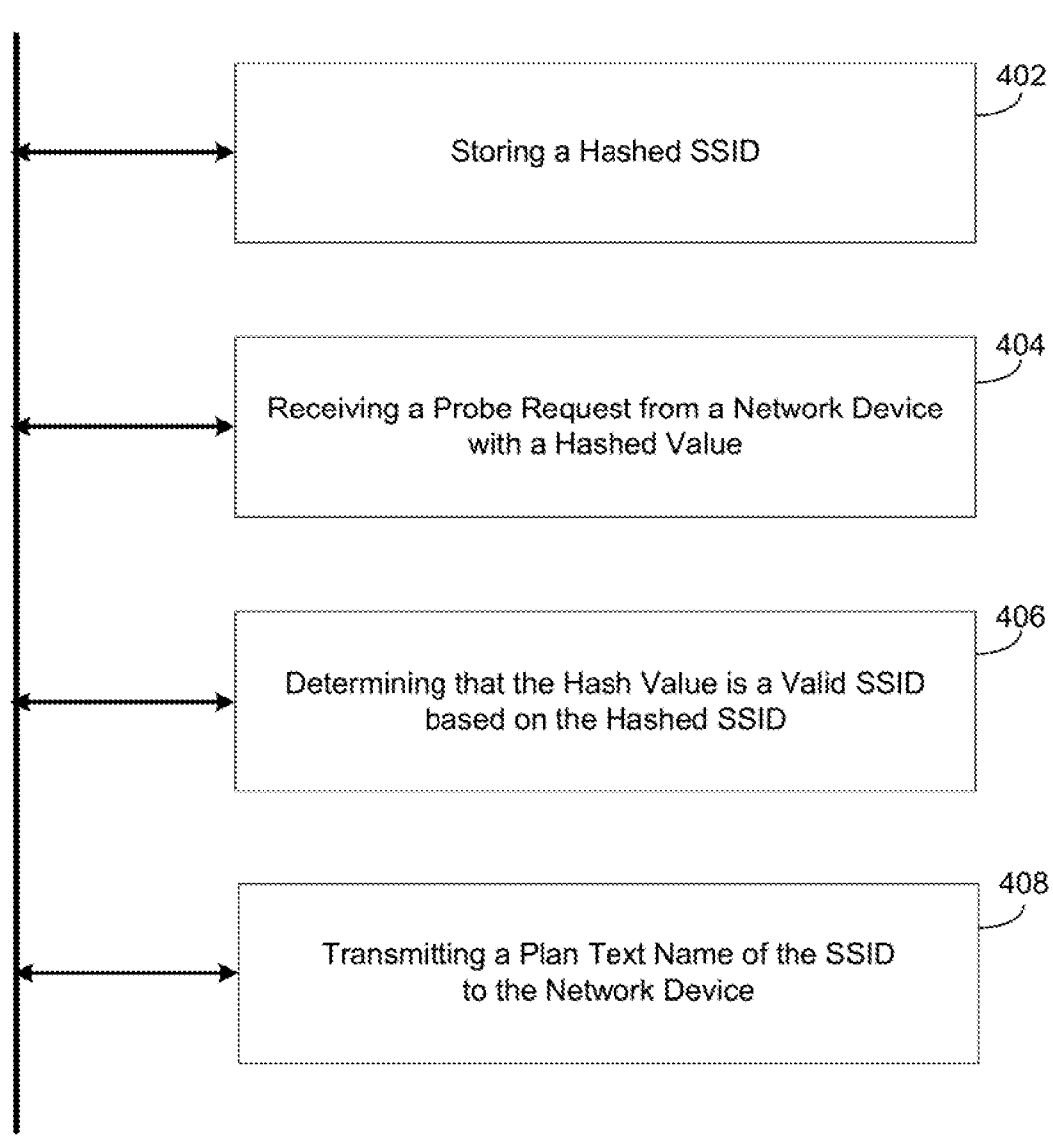
Storing a Hashed SSID                                    402
Receiving a Probe Request from a Network Device
with a Hashed Value                                       404
Determining that the Hash Value is a Valid SSID
based on the Hashed SSID                                  406
Transmitting a Plan Text Name of the SSID
to the Network Device                                     408

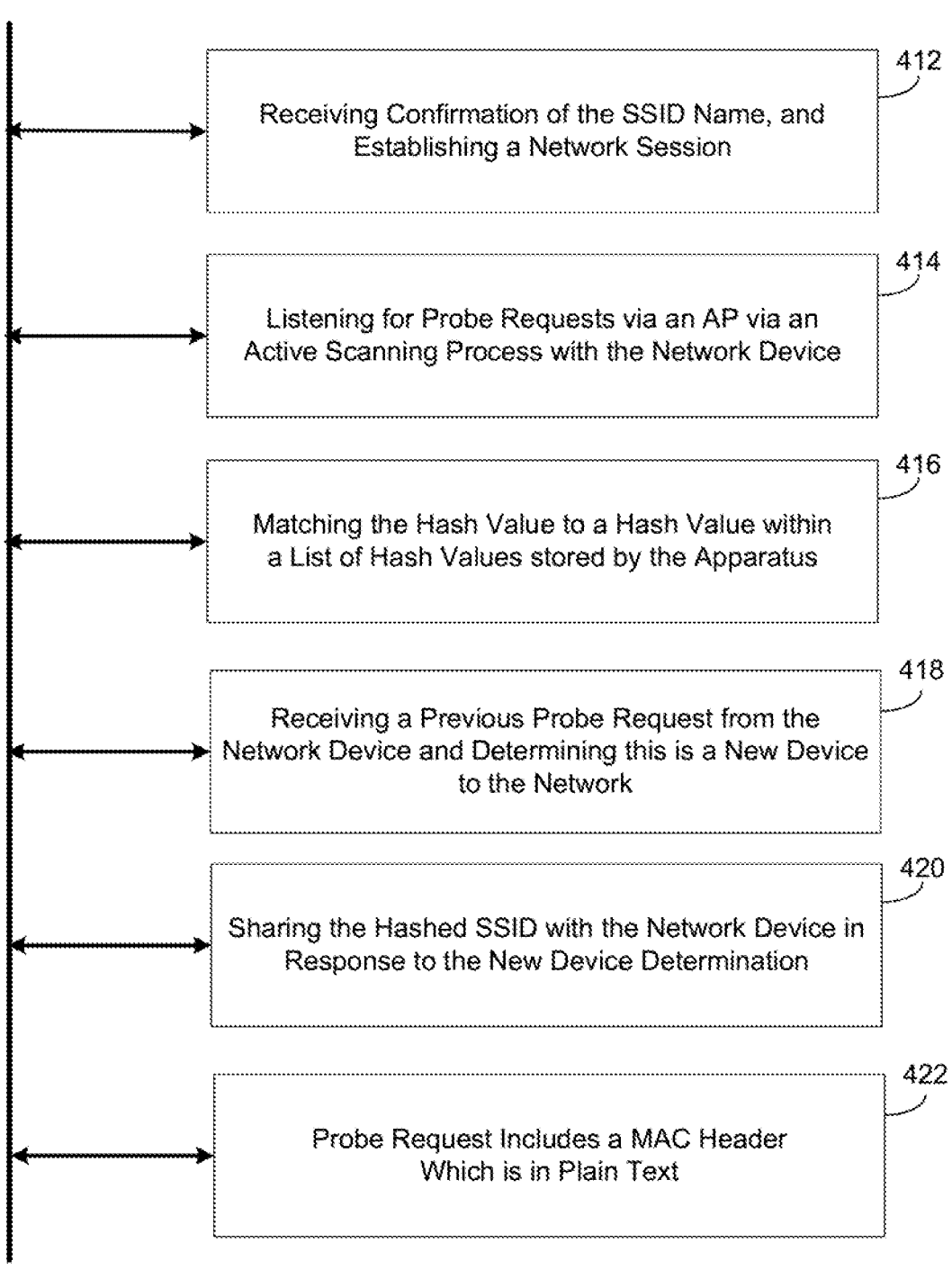

Receiving Confirmation of the SSID Name, and Establishing a Network Session

412

Listening for Probe Requests via an AP via an Active Scanning Process with the Network Device

414

Matching the Hash Value to a Hash Value within a List of Hash Values stored by the Apparatus

416

Receiving a Previous Probe Request from the Network Device and Determining this is a New Device to the Network

418

Sharing the Hashed SSID with the Network Device in Response to the New Device Determination

420

Probe Request Includes a MAC Header Which is in Plain Text

422

SECURE NETWORK IDENTIFICATION FOR ACTIVE SCANNING DEVICE

BACKGROUND

When a network device (e.g., client device, laptop, smartphone, smart-wearable, etc.) accesses a Wireless Fidelity (Wi-Fi) network, the network device obtains a network identifier (i.e., of a service set identifier (SSID)) of the network. The SSID is typically a string value in a natural language and is defined in the IEEE 802.11 wireless networking standards. Over the course of its life, a mobile device may access many different Wi-Fi networks and thus may receive many different SSIDs. Upon receiving an SSID, the mobile device stores the SSID in a list with all other SSIDs that the device has accessed.

SUMMARY

One example embodiment provides an apparatus that includes a network interface, a storage device configured to store a hash of a service set identifier (SSID) of a wireless network, and a processor configured to perform one or more of receive a probe request message transmitted from a network device, wherein the probe request message comprises a hash value, determine that the hash value within the probe request is a valid SSID based on the hash of the SSID of the wireless network stored in the storage device, and control the network interface to transmit a probe response with a plain text name of the SSID to the network device in response to the determination.

Another example embodiment provides a method that includes one or more of storing a hash of a service set identifier (SSID) of a wireless network via an apparatus, receiving a probe request message transmitted from a network device, wherein the probe request message comprises a hash value, determining that the hash value within the probe request is a valid SSID based on the hash of the SSID of the wireless network stored in the storage device, and controlling the network interface to transmit a probe response with a plain text name of the SSID to the network device in response to the determination.

A further example embodiment provides a computer-readable medium comprising instructions, that when read by a processor, cause the processor to perform one or more of storing a hash of a service set identifier (SSID) of a wireless network via an apparatus, receiving a probe request message transmitted from a network device, wherein the probe request message comprises a hash value, determining that the hash value within the probe request is a valid SSID based on the hash of the SSID of the wireless network stored in the storage device, and controlling the network interface to transmit a probe response with a plain text name of the SSID to the network device in response to the determination.

BRIEF DESCRIPTION OF THE DRAWINGS

FIG. 1 depicts a computing environment, according to example embodiments.

FIG. 3D is a diagram illustrating machine learning process via a cloud computing platform, according to example embodiments.

FIG. 4A is a diagram illustrating a method of secure network identification between an access point and a network device, according to example embodiments.

FIG. 4B is a diagram illustrating a method of secure network identification between the access point and the network device, according to other example embodiments.

DETAILED DESCRIPTION

Figure 2A:
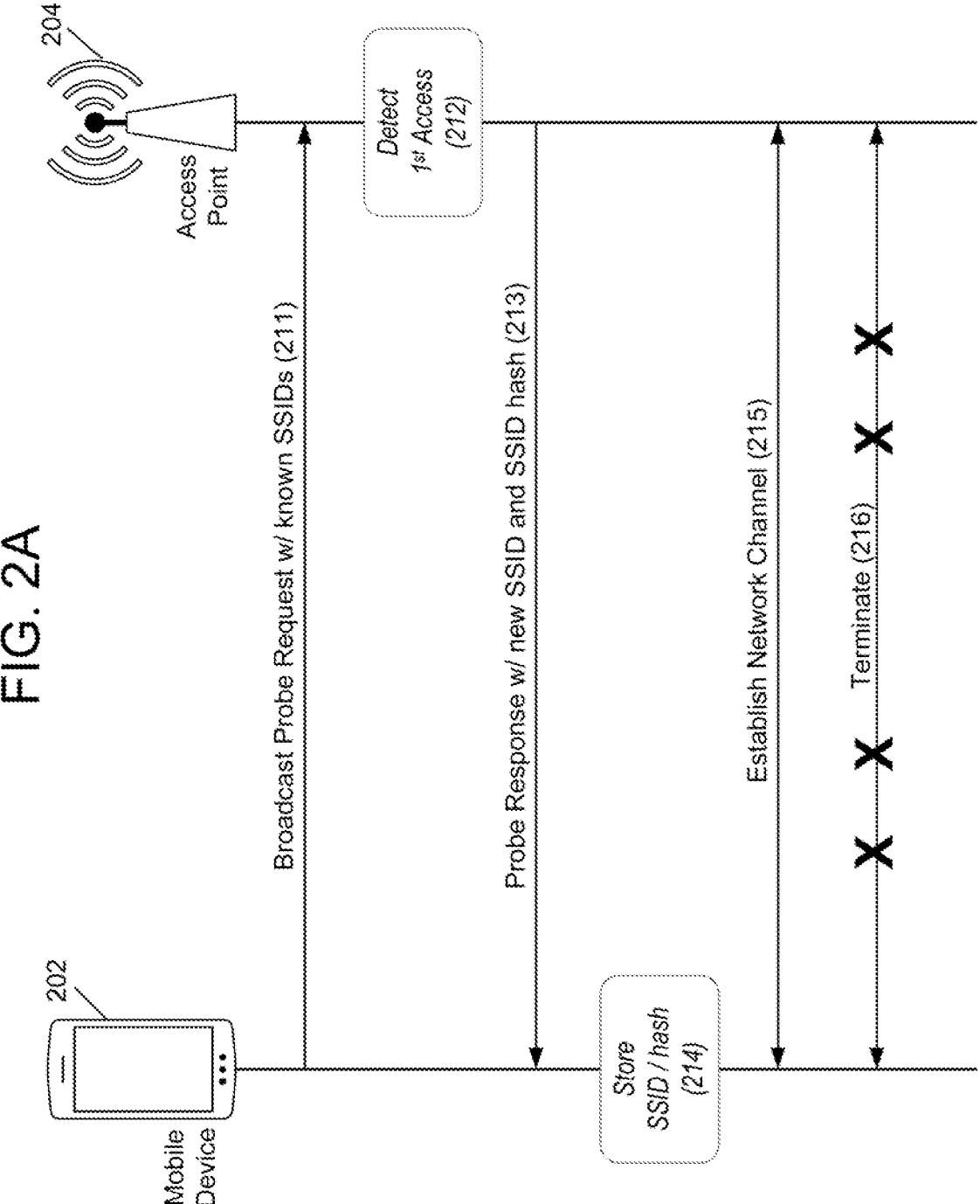
FIG. 2A is a diagram illustrating a process of accessing a new network for a first time, according to example embodiments.

It is to be understood that although this disclosure includes a detailed description of cloud computing, implementation of the teachings recited herein is not limited to a cloud computing environment. Rather, embodiments of the instant solution are capable of being implemented in conjunction with any other type of computing environment now known or later developed.

The example embodiments are directed to a network identification process that occurs between a device (e.g., a user device, server, appliance, etc.) attempting to access a network via an access point of that network. The process may be included within an active scanning process performed by the device as it actively searches for a network to join. Here, the device may iteratively broadcast a probe request message in hopes of finding a nearby network. However, rather than list known SSIDs (previously accessed by the device) within the probe request message, the device may list only hash values of the known SSIDs. In this way, the probe request obfuscates the SSID preventing unauthorized listeners from being able to detect a digital fingerprint of the device.

Networks can designate one SSID or more than one SSID, which can be used to identify the network. An SSID is typically a string value in plain text which recites or otherwise identifies a name of the network. Each time the device accesses a new wireless network (e.g., hotspot, home network, work network, transportation network, flight network, etc.), the device typically receives the SSID(s) of that network and stores them within its memory for use in subsequent probe requests. According to various embodiments, when a device accesses a network for the first time (i.e., a new network to the device), the access point may provide both an SSID(s) of the network and a hash of the SSID(s) to the device. In response, the device stores the SSID and the SSID hash in its memory and uses the hashed SSID in subsequent probe requests. This same process may be repeated each time the device accesses a new network. The result is that the device may store and use a list of hashed SSIDs within its probe requests instead of the actual SSIDs.

Some of the benefits of the example embodiments include increased security for devices on public networks (e.g., hotspots). Furthermore, sensitive data that is exposed over a public network during a network identification process between a device and an access point of the network may be obfuscated by using hashes instead of SSIDs in a probe request message provided that it is transmitted from the network device to the access point during an active scanning process by the device.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure, including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure, including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community with shared concerns (e.g., mission, security requirements, policy, and compliance considerations). It may be managed by organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Referring now to FIG. 1, a computing environment 100 is depicted. Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again, depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Computing environment 100 contains an example of an environment for executing at least some of the computer code involved in performing the inventive methods, such as secure network identification 200. In addition to block 200, computing environment 100 includes, for example, computer 101, wide area network (WAN) 102, end-user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smartphone, smartwatch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, the performance of a computer-implemented method may be distributed among multiple computers and/or between multiple locations. On the other hand, in this presentation of the computing environment 100, a detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is a memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off-chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric comprises switches and electrically conductive paths, such as the switches and electrically conductive paths that make up busses, bridges, physical input/output ports, and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read-only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smartwatches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer, and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer, and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer

101 is designed and programmed to provide a recommendation based on historical data, this data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanations of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as communicating with WAN 102, in other embodiments, a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both parts of a larger hybrid cloud.

Each time a mobile device accesses a Wi-Fi network, it provides a list of the SSIDs that the device has accessed to an access point of the Wi-Fi network. When the device has previously accessed such Wi-Fi network, the network and the device will authenticate automatically based on the SSID list providing the device with almost immediate network access. However, this action can be dangerous and susceptible to a negative action taken by an entity or hacker, for example. An SSID list is unique enough to not only allow an individual to identify that a particular device was present in a particular location, but also a particular user of that device. Thus, a digital fingerprint of a user can be captured and traced, leaving the user susceptible to even more attacks, including, for example, identity theft.

FIG. 2A illustrates a process 201 of accessing a network via an access point 204 for a first time according to example embodiments. In this example, the process is performed by a mobile device 202, such as a smartphone, smart-wearable device, tablet, laptop, or the like. However, it should also be appreciated that the device does not need to be a mobile device and may include a desktop computer, an appliance, a server, a cloud platform, or the like.

Referring to FIG. 2A, the mobile device 202 iteratively broadcasts a probe request message to all available networks in its vicinity in 211. An example of the probe request message is provided in FIG. 2B. The probe request message includes only hashes of the SSIDs that are known to the mobile device 202, while the remaining fields in the probe request may not be hashed but may instead be in plain text. The broadcast of the probe request message may be repeated indefinitely. In this example, the mobile device 202 is yet to access the network. That is, this is the first time that the mobile device 202 has established a connection with the network.

According to various embodiments, the access point 204 may detect that this is the first time that the mobile device has accessed the network. For example, the access point 204 may compare the hashed SSIDs in the probe request to its own known hashed SSIDs of the network to which it provides access. If the mobile device 202 has visited the network before, a valid hashed SSID for the network would be in the frame body 222 of the probe request. However, in this example, the access point 204 does not find a match to valid SSIDs of the network in the probe request. Therefore, the access point determines that this is a new device that is yet to access the network in 212.

In response to determining that the mobile device 202 is accessing the network for the first time, in 213, the access point 204 sends a probe response to the access point with an identifier of the SSID of the network and a hash of the SSID. In 214, the mobile device 202 stores the SSID with the hashed SSID in its local storage or a memory device. The SSID may be added to subsequent iterations of the broadcast probe request message that are transmitted by the mobile device 202. Furthermore, in 215, a session is established between the mobile device 202 and the network via the access point 204. Here, the mobile device 202 may access various services such as data, voice, email, Internet, and the like, via the session established with the network via the access point 204. At some point, the session/connection is terminated in 216. For example, the mobile device 202 may leave the service range of the access point 204 and of the network.

Figure 2B:
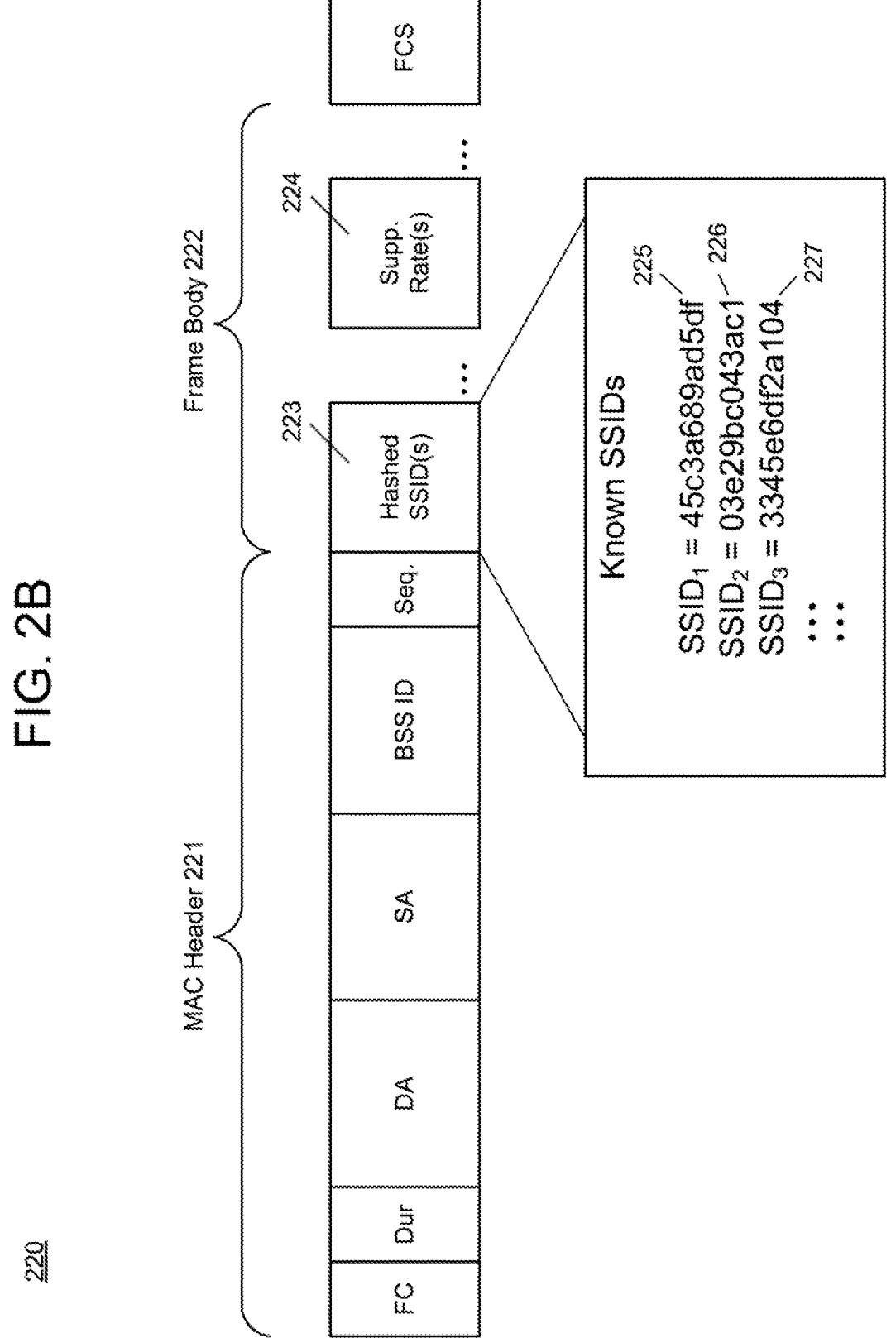
FIG. 2B is a diagram illustrating an example of a probe request that may be submitted during a network identification process, according to example embodiments.

FIG. 2B illustrates an example of a probe request message 220 that may be transmitted by the mobile device in step 211 of FIG. 2A, according to example embodiments. Referring to FIG. 2B, the probe request message 220 includes a media access control (MAC) header 221 and a frame body 222. Here, the MAC header 221 includes a frame control (FC)

field, a duration field, a destination address (DA) field, a source address (SA) field, a basic service set identifier (BSSID) field, which includes the SSID(s) of the access point, and the like. Furthermore, the frame body includes hashed SSIDs 223 and supported frame rates 224 of the mobile device 202.

Examples of hashed SSIDs 225, 226, and 227 are shown below the probe request in FIG. 2B. The hashed SSIDs 225, 226, and 227 are the hashed values of the known SSIDs to the mobile device 202 (i.e., the names/identifiers of networks that the mobile device 202 has previously accessed). Here, the hashed SSIDs 225, 226, and 227 may be previously provided by the respective networks during the initial respective accesses of those networks.

Figure 2C:
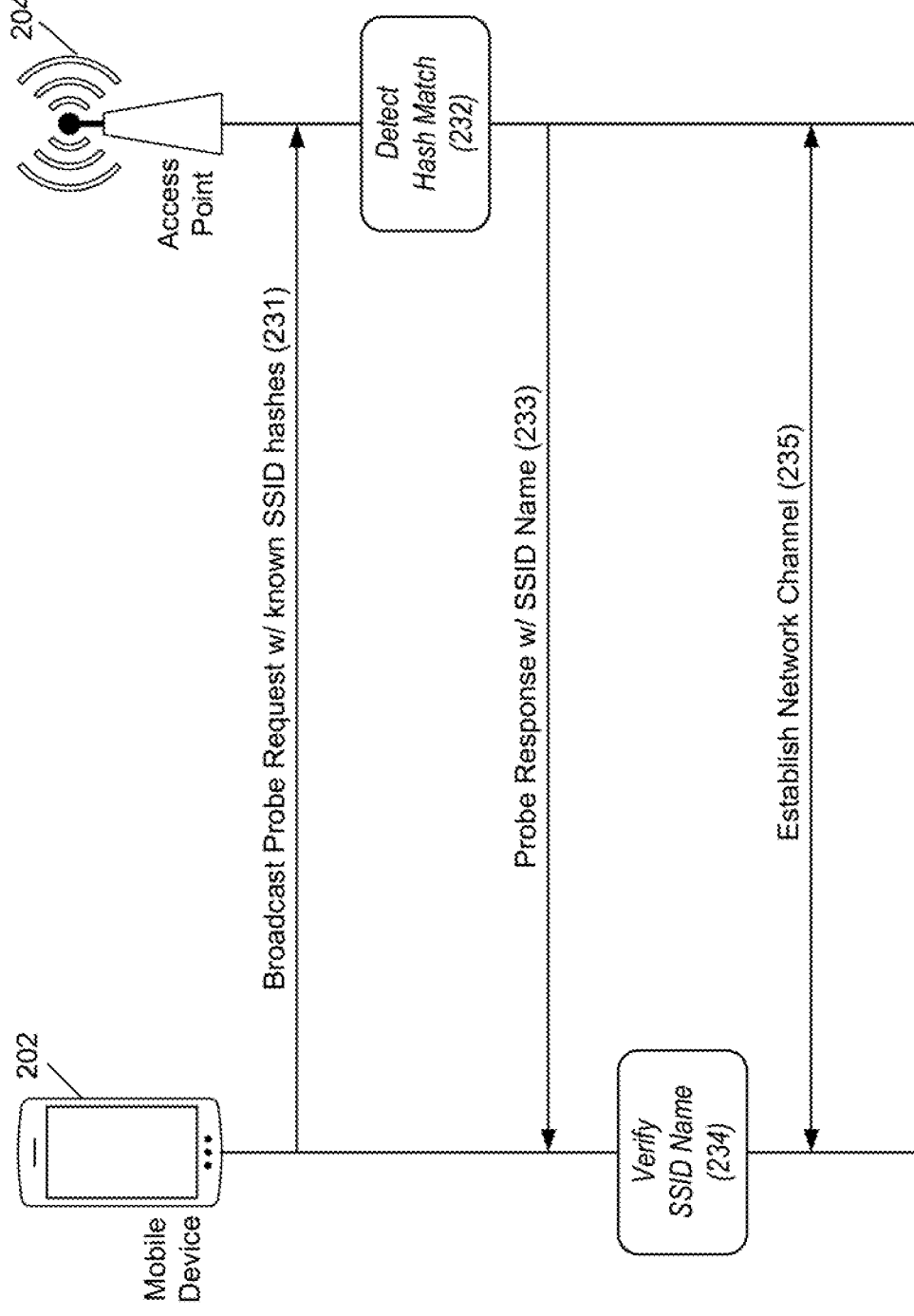
FIG. 2C is a diagram illustrating a process of accessing a known network for a subsequent time, according to example embodiments.

FIG. 2C illustrates a process 230 of accessing a known network for a subsequent time according to example embodiments. For example, the known network may be the same network accessed for the first time in FIG. 2A, or a different network that has previously been accessed by the mobile device 202. Referring to FIG. 2C, in 231, the mobile device 202 broadcasts a probe request to nearby networks. In this example, the probe request is received by the access point 204, that manages a network that the mobile device 202 has previously accessed. In this example, the probe request includes a hashed SSID of the network. In 232, the access point 204 compares the hashed SSIDs in the probe request to the known SSIDs of the network and identifies a matching hashed SSID in its known hashed SSID values. Accordingly, the access point 204 determines that the mobile device 202 has previously accessed the network.

In 233, the access point transmits a name of the network (i.e., the SSID) to the mobile device 202, which the mobile device can use for validation. Here, the mobile device 202 may compare the name of the network to its known network names, which are obfuscated in the probe request by using hashed SSIDs. If the mobile device 202 matches the name to its known network names, the mobile device 202 determines the network is verified, in 234. In 235, a network session is started for the mobile device 202 via the access point 204.

Probe requests are typically shared as plain text, which is a vulnerability that can be exploited by various individuals. In example embodiments, the format and the structure of the probe request remain the same. However, the security vulnerabilities (i.e., the SSIDs) are hashed. Furthermore, a novel verification process is designed in which the access point can still validate the mobile device 202 and vice-versa using the processes described in FIGS. 2A and 2C. The only change on the message is the obfuscation of a section of the probe messages in which the SSID is stored. The remaining sections of the probe request message may remain plain text, including the MAC header 221.

Related devices use passive scanning (access point was waiting for the AP beacon) during a network identification process. However, devices can perform active scanning in which the device is the one that sends the probe message as broadcast to all access points/networks nearby rather than wait for a request from the access points. In the example embodiments, the probe request message is sent as part of an active scanning process in which the device contacts the access point first with an obfuscated SSID. That is, the very first time the probe request is provided to the network/access point, the SSID is hashed, yet still, a validation of the SSID can be performed.

The same process is not capable of being performed within passive scanning. In particular, in passive scanning, the access point is the first device to communicate. While the difference may seem small, it is not when the details behind both implementations are understood. In particular, in a passive scanning process, the access point sends a broadcast of the SSID. If such an SSID were hashed, the device would have to gather the hash and then proceed to execute a hash function on all the SSIDs stored locally, requiring hashing all the SSIDs held by the device (which may be in the hundreds or thousands and is very computing intensive) and then perform the comparison. Furthermore, this process would need to repeat itself every time a new hash is received, resulting in an inefficient use of computational power on the device, potentially resulting in performance issues.

In contrast, in the present application, a device performs active scanning and contacts the access point first. Once the device successfully connects for the first time to the access point, the access point can provide a copy of the hash of its SSID to the device. Then the device can store the hashed SSID. Furthermore, when the device sends its next probe request message, it will send the hashed SSID for the network rather than the SSID in plain text. The access points will gather that hash and check against their own to determine if that device is a trusted device. This process is significantly faster and less computationally intensive than hashing all possible SSIDs known to the device.

Figure 3A:
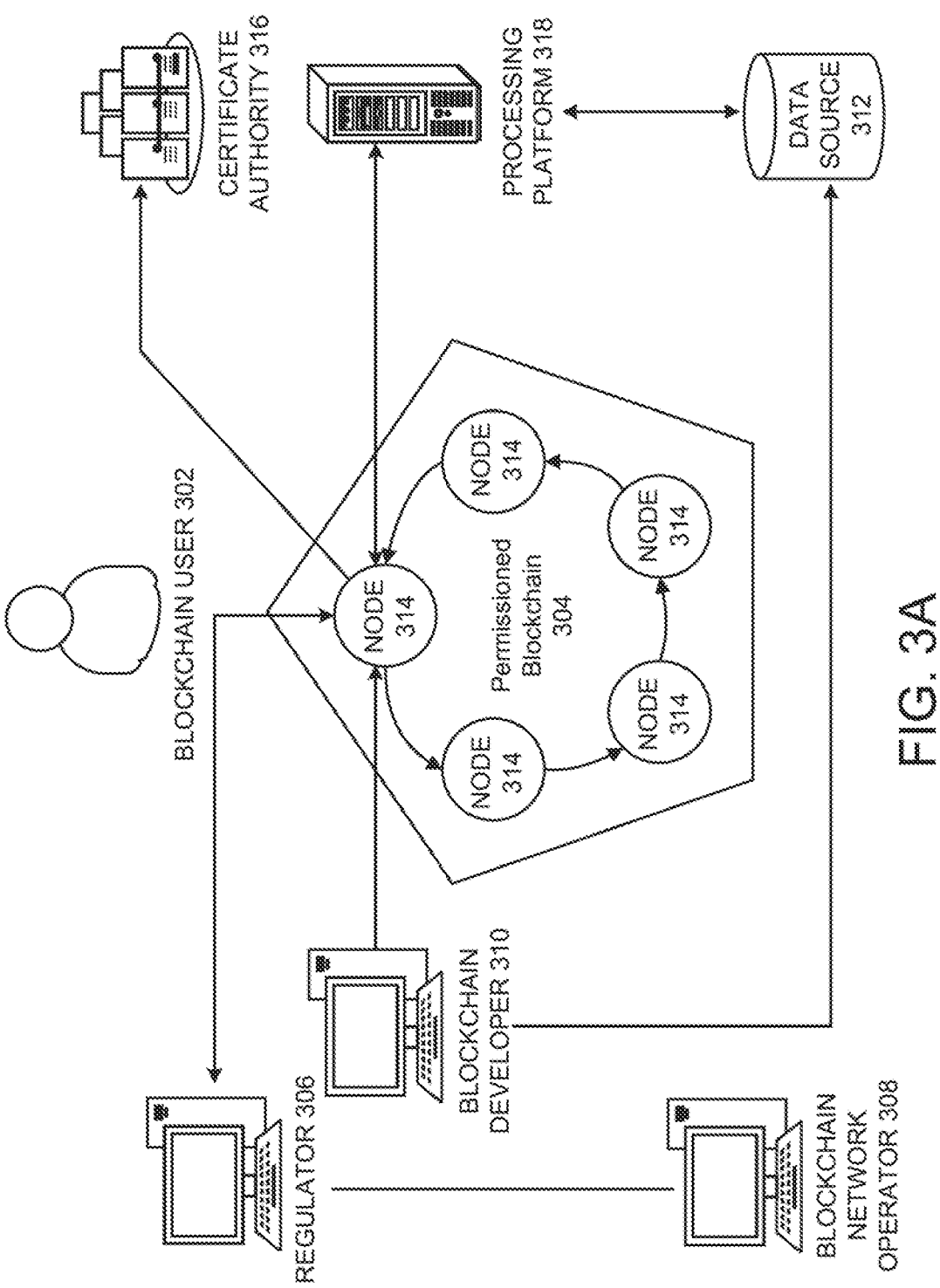
FIG. 3A is a diagram illustrating a permissioned network, according to example embodiments.

FIG. 3A illustrates an example of a permissioned blockchain network 300, which features a distributed, decentralized peer-to-peer architecture. The blockchain network may interact with the cloud computing environment 160, allowing additional functionality such as peer-to-peer authentication for data written to a distributed ledger. In this example, a blockchain user 302 may initiate a transaction to the permissioned blockchain 304. In this example, the transaction can be a deploy, invoke, or query, and may be issued through a client-side application leveraging an SDK, directly through an API, etc. Networks may provide access to a regulator 306, such as an auditor. A blockchain network operator 308 manages member permissions, such as enrolling the regulator 306 as an "auditor" and the blockchain user 302 as a "client". An auditor could be restricted only to querying the ledger, whereas a client could be authorized to deploy, invoke, and query certain types of chaincode.

A blockchain developer 310 can write chaincode and client-side applications. The blockchain developer 310 can deploy chaincode directly to the network through an interface. To include credentials from a traditional data source 312 in chaincode, the developer 310 could use an out-of-band connection to access the data. In this example, the blockchain user 302 connects to the permissioned blockchain 304 through a peer node 314. Before proceeding with any transactions, the peer node 314 retrieves the user's enrollment and transaction certificates from a certificate authority 316, which manages user roles and permissions. In some cases, blockchain users must possess these digital certificates in order to transact on the permissioned blockchain 304. Meanwhile, a user attempting to utilize chaincode may be required to verify their credentials on the traditional data source 312. To confirm the user's authorization, chaincode can use an out-of-band connection to this data through a traditional processing platform 318.

Figure 3B:
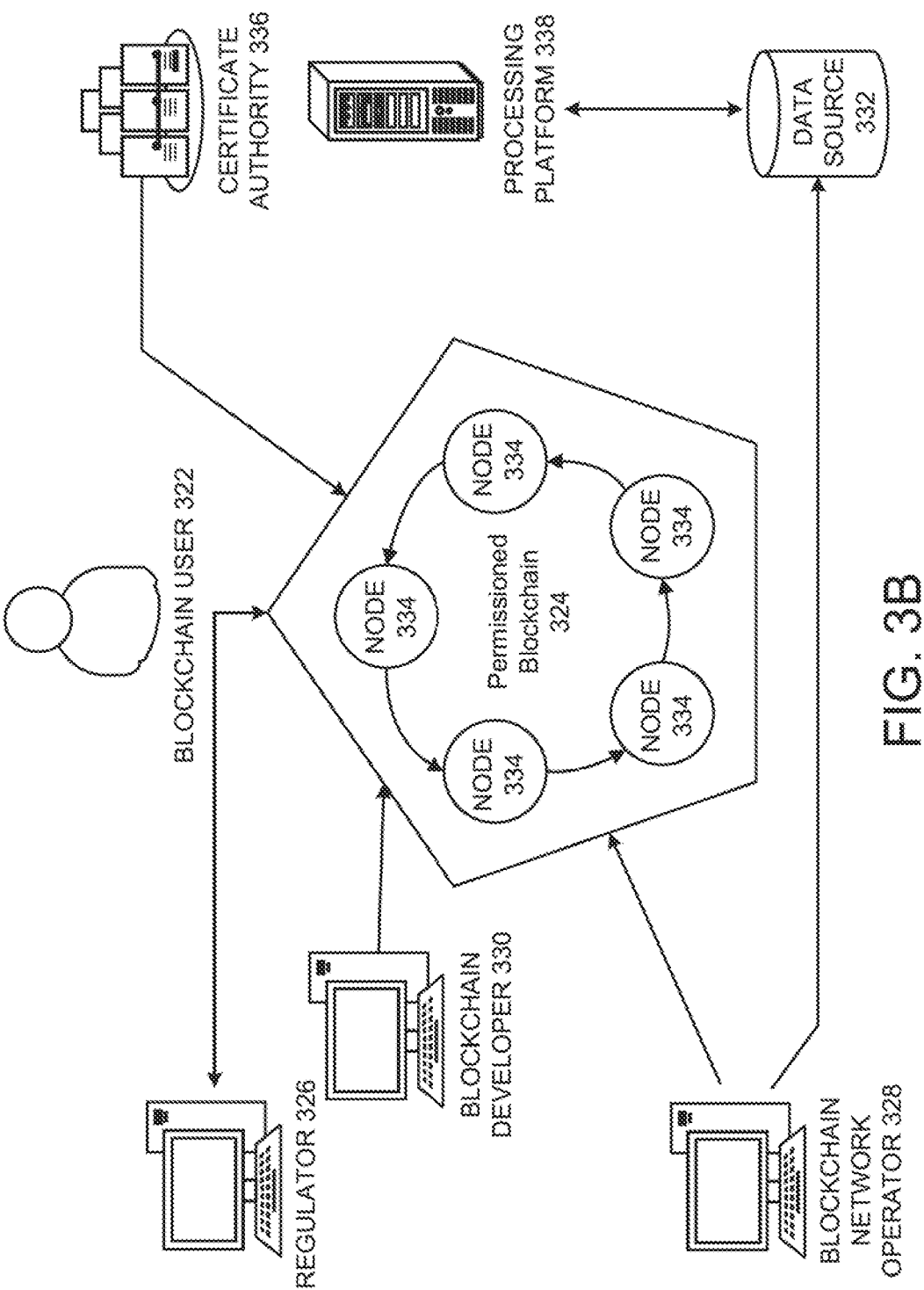
FIG. 3B is a diagram illustrating another permissioned network, according to example embodiments.

FIG. 3B illustrates another example of a permissioned blockchain network 320, which features a distributed, decentralized peer-to-peer architecture. In this example, a blockchain user 322 may submit a transaction to the permissioned blockchain 324. In this example, the transaction can be a deploy, invoke, or query, and may be issued through a client-side application leveraging an SDK, directly through an API, etc. Networks may provide access to a regulator 326, such as an auditor. A blockchain network operator 328 manages member permissions, such as enrolling the regulator 326 as an "auditor" and the blockchain user 322 as a "client". An auditor could be restricted only to querying the ledger, whereas a client could be authorized to deploy, invoke, and query certain types of chaincode.

A blockchain developer 330 writes chaincode and client-side applications. The blockchain developer 330 can deploy chaincode directly to the network through an interface. To include credentials from a traditional data source 332 in chaincode, the developer 330 could use an out-of-band connection to access the data. In this example, the blockchain user 322 connects to the network through a peer node 334. Before proceeding with any transactions, the peer node 334 retrieves the user's enrollment and transaction certificates from the certificate authority 336. In some cases, blockchain users must possess these digital certificates in order to transact on the permissioned blockchain 324. Meanwhile, a user attempting to utilize chaincode may be required to verify their credentials on the traditional data source 332. To confirm the user's authorization, chaincode can use an out-of-band connection to this data through a traditional processing platform 338.

In some embodiments, the blockchain herein may be a permissionless blockchain. In contrast with permissioned blockchains, which require permission to join, anyone can join a permissionless blockchain. For example, to join a permissionless blockchain, a user may create a personal address and begin interacting with the network by submitting transactions and hence adding entries to the ledger. Additionally, all parties have the choice of running a node on the system and employing the mining protocols to help verify transactions.

Figure 3C:
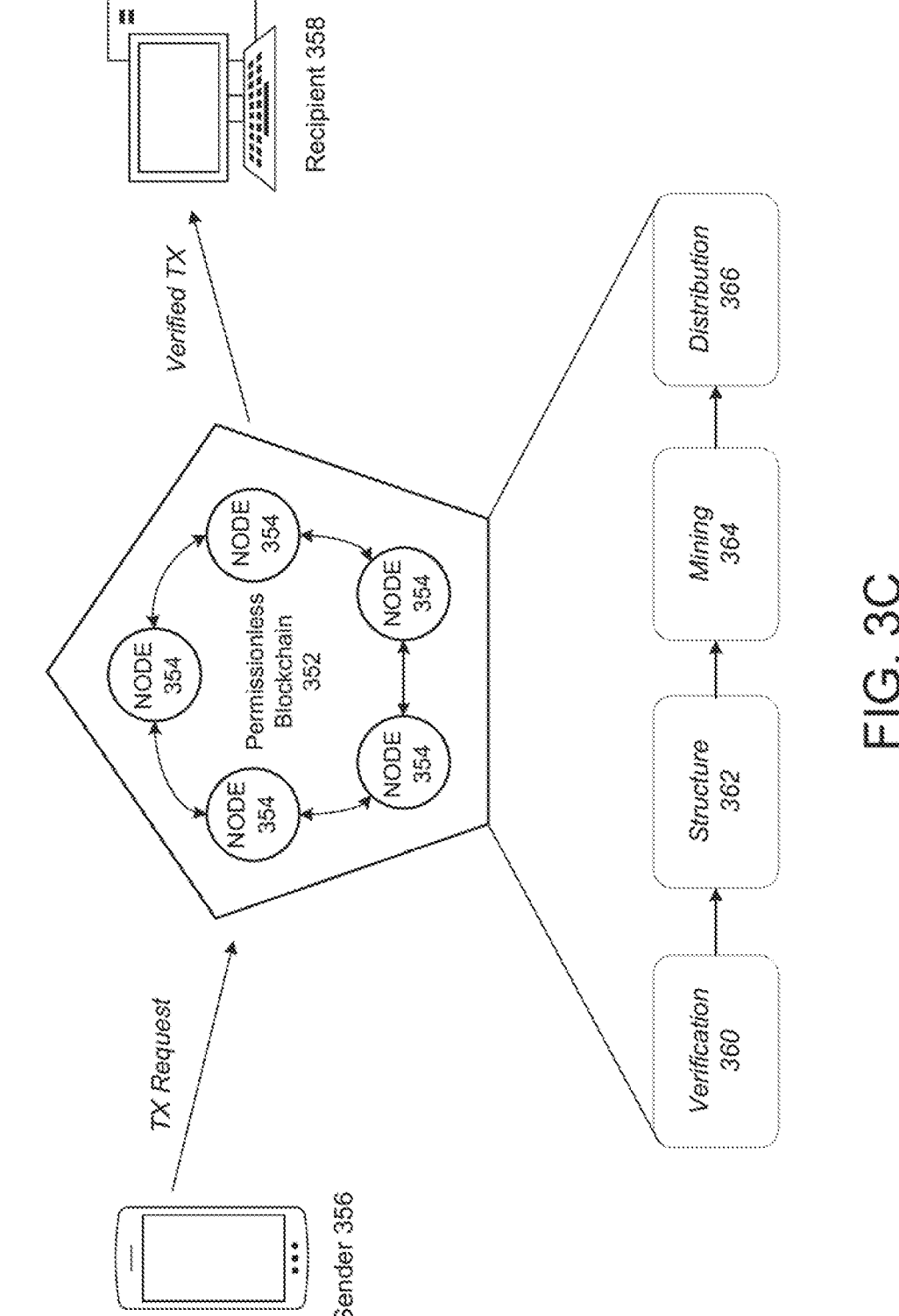
FIG. 3C is a diagram illustrating a further permissionless network, according to example embodiments.

FIG. 3C illustrates a process 350 of a transaction being processed by a permissionless blockchain 352, including a plurality of nodes 354. A sender 356 desires to send payment or some other form of value (e.g., a deed, medical records, a contract, a good, a service, or any other asset that can be encapsulated in a digital record) to a recipient 358 via the permissionless blockchain 352. In one embodiment, each of the sender device 356 and the recipient device 358 may have digital wallets (associated with the blockchain 352) that provide user interface controls and a display of transaction parameters. In response, the transaction is broadcast throughout the blockchain 352 to the nodes 354. Depending on the blockchain's 352 network parameters, the nodes verify 360 the transaction based on rules (which may be pre-defined or dynamically allocated) established by the permissionless blockchain 352 creators. For example, this may include verifying the identities of the parties involved, etc. The transaction may be verified immediately, or it may be placed in a queue with other transactions, and the nodes 354 determine if the transactions are valid based on a set of network rules.

In structure 362, valid transactions are formed into a block and sealed with a lock (hash). This process may be performed by mining nodes among the nodes 354. Mining nodes may utilize additional software specifically for mining and creating blocks for the permissionless blockchain 352. Each block may be identified by a hash (e.g., 256-bit number, etc.) created using an algorithm agreed upon by the network. Each block may include a header, a pointer or reference to a hash of a previous block's header in the chain, and a group of valid transactions. The reference to the previous block's hash is associated with the creation of the secure independent chain of blocks.

Before blocks can be added to the blockchain, the blocks must be validated. Validation for the permissionless blockchain 352 may include a proof-of-work (PoW) which is a solution to a puzzle derived from the block's header. Although not shown in the example of FIG. 3C, another process for validating a block is proof-of-stake. Unlike the proof-of-work, where the algorithm rewards miners who solve mathematical problems, with the proof of stake, a creator of a new block is chosen in a deterministic way, depending on its wealth, also defined as "stake." Then, a similar proof is performed by the selected/chosen node.

With mining 364, nodes try to solve the block by making incremental changes to one variable until the solution satisfies a network-wide target. This creates the PoW, thereby ensuring correct answers. In other words, a potential solution must prove that computing resources were drained in solving the problem. In some types of permissionless blockchains, miners may be rewarded with value (e.g., coins, etc.) for correctly mining a block.

Here, the PoW process, alongside the chaining of blocks, makes modifications of the blockchain extremely difficult, as an attacker must modify all subsequent blocks in order for the modifications of one block to be accepted. Furthermore, as new blocks are mined, the difficulty of modifying a block increases, and the number of subsequent blocks increases. With distribution 366, the successfully validated block is distributed through the permissionless blockchain 352, and all nodes 354 add the block to a majority chain which is the permissionless blockchain's 352 auditable ledger. Furthermore, the value in the transaction submitted by the sender 356 is deposited or otherwise transferred to the digital wallet of the recipient device 358.

Figure 3E:
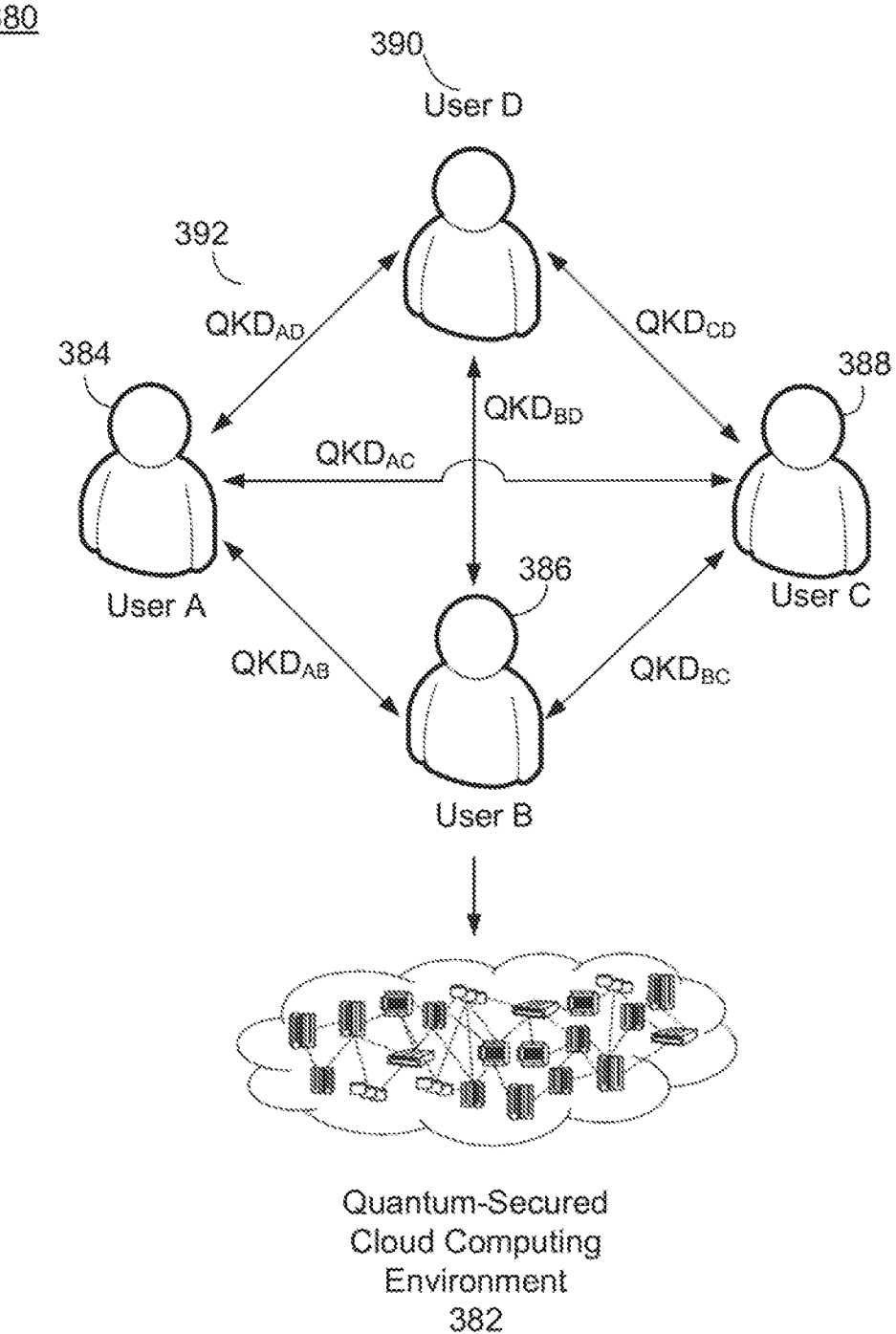
FIG. 3E is a diagram illustrating a quantum computing environment associated with a cloud computing platform, according to example embodiments.

FIGS. 3D and 3E illustrate additional examples of use cases for cloud computing that may be incorporated and used herein. FIG. 3D illustrates an example 370 of a cloud computing environment 160, which stores machine learning (artificial intelligence) data. Machine learning relies on vast quantities of historical data (or training data) to build predictive models for accurate prediction on new data. Machine learning software (e.g., neural networks, etc.) can often sift through millions of records to unearth non-intuitive patterns.

In the example of FIG. 3D, a host platform 376, builds and deploys a machine learning model for predictive monitoring of assets 378. Here, the host platform 366 may be a cloud platform, an industrial server, a web server, a personal computer, a user device, and the like. Assets 378 can be any type of asset (e.g., machine or equipment, etc.), such as an aircraft, locomotive, turbine, medical machinery and equipment, oil and gas equipment, boats, ships, vehicles, and the like. As another example, assets 378 may be non-tangible assets such as stocks, currency, digital coins, insurance, or the like.

The cloud computing environment 160 can be used to significantly improve both a training process 372 of the machine learning model and a predictive process 374 based on a trained machine learning model. For example, in 372, rather than requiring a data scientist/engineer or another user to collect the data, historical data may be stored by the assets 378 themselves (or through an intermediary, not shown) on the cloud computing environment 160. This can significantly reduce the collection time needed by the host platform 376 when performing predictive model training. For example, data can be directly and reliably transferred straight from its place of origin to the cloud computing environment 160. By using the cloud computing environment 160 to ensure the security and ownership of the collected data, smart contracts may directly send the data from the assets to the individuals that use the data for building a machine learning model. This allows for sharing of data among the assets 378.

Furthermore, training of the machine learning model on the collected data may take rounds of refinement and testing by the host platform 376. Each round may be based on additional data or data that was not previously considered to help expand the knowledge of the machine learning model. In 372, the different training and testing steps (and the associated data) may be stored on the cloud computing environment 160 by the host platform 376. Each refinement of the machine learning model (e.g., changes in variables, weights, etc.) may be stored in the cloud computing environment 160 to provide verifiable proof of how the model was trained and what data was used to train the model. For example, the machine learning model may be stored on a blockchain to provide verifiable proof. Furthermore, when the host platform 376 has achieved a trained model, the resulting model may be stored on the cloud computing environment 160.

After the model has been trained, it may be deployed to a live environment where it can make predictions/decisions based on executing the final trained machine learning model. For example, in 374, the machine learning model may be used for condition-based maintenance (CBM) for an asset such as an aircraft, a wind turbine, a healthcare machine, and the like. In this example, data fed back from asset 378 may be input into the machine learning model and used to make event predictions such as failure events, error codes, and the like. Determinations made by executing the machine learning model at the host platform 376 may be stored on the cloud computing environment 160 to provide auditable/verifiable proof. As one non-limiting example, the machine learning model may predict a future breakdown/failure to a part of the asset 378 and create an alert or a notification to replace the part. The data behind this decision may be stored by the host platform 376 and/or on the cloud computing environment 160. In one embodiment, the features and/or the actions described and/or depicted herein can occur on or with respect to the cloud computing environment 160.

FIG. 3E illustrates an example 380 of a quantum-secure cloud computing environment 382, which implements quantum key distribution (QKD) to protect against a quantum computing attack. In this example, cloud computing users can verify each other's identities using QKD. This sends information using quantum particles such as photons, which cannot be copied by an eavesdropper without destroying them. In this way, a sender and a receiver, through the cloud computing environment, can be sure of each other's identity.

In the example of FIG. 3E, four users are present 384, 386, 388, and 390. Each pair of users may share a secret key 392 (i.e., a QKD) between themselves. Since there are four nodes in this example, six pairs of nodes exist, and therefore six different secret keys 392 are used, including $QKD_{AB}$, $QKD_{AC}$, $QKD_{AD}$, $QKD_{BC}$, $QKD_{BD}$, and $QKD_{CD}$. Each pair can create a QKD by sending information using quantum particles such as photons, which cannot be copied by an eavesdropper without destroying them. In this way, a pair of users can be sure of each other's identity.

The operation of the cloud computing environment 382 is based on two procedures (i) creation of transactions and (ii) construction of blocks that aggregate the new transactions. New transactions may be created similar to a traditional network, such as a blockchain network. Each transaction may contain information about a sender, a receiver, a time of creation, an amount (or value) to be transferred, a list of reference transactions that justifies the sender has funds for the operation, and the like. This transaction record is then sent to all other nodes, where it is entered into a pool of unconfirmed transactions. Here, two parties (i.e., a pair of users from among 384-390) authenticate the transaction by providing their shared secret key 392 (QKD). This quantum signature can be attached to every transaction, making it exceedingly difficult to be tampered with. Each node checks its entries with respect to a local copy of the cloud computing environment 382 to verify that each transaction has sufficient funds.

FIG. 4A illustrates a method 400 of secure network identification between an access point and a network device according to example embodiments. For example, the method 400 may be performed by an access point of a computing network. Referring to FIG. 4A, in 402, the method may include storing a hash of a service set identifier (SSID) of a wireless network via an apparatus. For example, the hashed SSID may be stored within a larger list of hashed SSIDs of SSIDs that are valid for the network to which the access point controls access. To generate the hashed SSID, the access point may use a predefined hash function and apply it to the SSID (e.g., network name, etc.) to generate a hash value.

In 404, the method may include receiving a probe request message transmitted from a network device, wherein the probe request message comprises a hash value. In 406, the method may include determining that the hash value within the probe request is a valid SSID based on the hash of the SSID of the wireless network stored in the storage device. In 408, the method may include controlling the network interface to transmit a probe response with a plain text name of the SSID to the network device in response to the determination.

FIG. 4B illustrates a method 410 of secure network identification between the access point and the network device according to other example embodiments. Referring to FIG. 4B, in 412, the method may include receiving a confirmation message from the network device which confirms the validation of the name of the SSID from the network device, and in response, establishing a network session between the apparatus and the network device. In some embodiments, the apparatus comprises an access point (AP) of the wireless network, and in 414, the method may further include listening for probe requests via an active scanning process performed between the network device and the AP.

In 416, the method may further include determining that the hash value is a valid SSID by matching the hash value to a hash value within a list of hash values stored in the stored device, which correspond to a plurality of valid SSIDs of the wireless network. In 418, the method may further include receiving a previous probe request message from the network device, which does not include the hash value, and in response, determining that the network device is newly connected to the wireless network. In 420, the method may further include automatically sharing the hash value of the SSID with the network device upon the determination that the network device is newly connected to the wireless network. In 422, the probe request message may include a media access control (MAC) header that is in plain text.

The above embodiments may be implemented in hardware, in a computer program executed by a processor, in firmware, or in a combination of the above. A computer program may be embodied on a computer-readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Although an exemplary embodiment of at least one of a system, method, and computer-readable medium has been illustrated in the accompanying drawings and described in the foregoing detailed description, it will be understood that the application is not limited to the embodiments disclosed but is capable of numerous rearrangements, modifications, and substitutions as set forth and defined by the following claims. For example, the system's capabilities of the various figures can be performed by one or more of the modules or components described herein or in a distributed architecture and may include a transmitter, receiver, or pair of both. For example, all or part of the functionality performed by the individual modules may be performed by one or more of these modules. Further, the functionality described herein may be performed at various times and in relation to various events, internal or external, to the modules or components. Also, the information sent between various modules can be sent between the modules via at least one of: a data network, the Internet, a voice network, an Internet Protocol network, a wireless device, a wired device, and/or via a plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone, or any other suitable computing device, or combination of devices. Presenting the above-described functions as being performed by a "system" is not intended to limit the scope of the present application in any way but is intended to provide one example of many embodiments. Indeed, methods, systems, and apparatuses disclosed herein may be implemented in localized and distributed forms consistent with computing technology.

It should be noted that some of the system features described in this specification have been presented as modules in order to more particularly emphasize their implementation independence. For example, a module may be implemented as a hardware circuit comprising custom, very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations, which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction or many instructions and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations, including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order and/or with hardware elements in configurations that are different from those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only, and the scope of the application is to be defined solely by the appended claims when considered with a full range of equivalents and modifications (e.g., protocols, hardware devices, software platforms, etc.) thereto.

What is claimed is:

1. An apparatus, comprising:
a network interface;
a storage device configured to store a hash of a service set identifier (SSID) of a wireless network; and
a processor configured to:
  receive a previous probe request message from a network device which does not include a hash value of the SSID, and in response, determine that the network device is newly connected to the wireless network,
  automatically share the hash value of the SSID with the network device upon the determination that the network device is newly connected to the wireless network,
  subsequent to receiving the previous probe request and after disconnecting from the network device, receive a probe request message transmitted from the network device, wherein the probe request message comprises the hash value,
  determine that the hash value within the probe request is a valid SSID based on the hash of the SSID of the wireless network stored in the storage device, and
  control the network interface to transmit a probe response with a plain text name of the SSID to the network device in response to the determination.

2. The apparatus of claim 1, wherein the network interface is configured to receive a confirmation message from the network device which confirms the name of the SSID from the network device, and in response, establishes a network session between the apparatus and the network device.

3. The apparatus of claim 1, wherein the apparatus comprises an access point (AP) of the wireless network that listens for probe requests via an active scanning process performed between the network device and the AP.

4. The apparatus of claim 1, wherein the processor is configured to determine that the hash value is a valid SSID based on a same hash value within a list of hash values stored in the storage device.

5. The apparatus of claim 1, wherein the probe request message comprises a frame body having a plurality of hash values for different SSIDs.

6. The apparatus of claim 1, wherein the probe request message comprises a media access control (MAC) header that is in plain text.

7. A method, comprising:
storing a hash of a service set identifier (SSID) of a wireless network via an apparatus;
receiving a previous probe request message from a network device which does not include a hash value of the SSID, and in response, determining that the network device is newly connected to the wireless network,
automatically sharing the hash value of the SSID with the network device upon the determination that the network device is newly connected to the wireless network,
subsequent to receiving the previous probe request and after disconnecting from the network device, receiving a probe request message transmitted from the network device, wherein the probe request message comprises the hash value;
determining that the hash value within the probe request is a valid SSID based on the hash of the SSID of the wireless network stored in the storage device; and
controlling the network interface to transmit a probe response with a plain text name of the SSID to the network device in response to the determination.

8. The method of claim 7, comprising receiving a confirmation message from the network device which confirms the name of the SSID from the network device, and in response, establishes a network session between the apparatus and the network device.

9. The method of claim 7, comprising listening for probe requests via an active scanning process performed between the network device and an access point (AP) of the wireless network, wherein the apparatus comprises the AP.

10. The method of claim 7, comprising determining that the hash value is a valid SSID by matching the hash value to a hash value within a list of hash values stored in the stored device which correspond to a plurality of valid SSIDs of the wireless network.

11. The method of claim 7, wherein the probe request message comprises a media access control (MAC) header that is in plain text.

12. A computer-readable storage medium comprising instructions, that when read by a processor, cause the processor to perform:
storing a hash of a service set identifier (SSID) of a wireless network via an apparatus;
receiving a previous probe request message from a network device which does not include a hash value of the SSID, and in response, determining that the network device is newly connected to the wireless network,
automatically sharing the hash value of the SSID with the network device upon the determination that the network device is newly connected to the wireless network,
subsequent to receiving the previous probe request and after disconnecting from the network device, receiving a probe request message transmitted from the network device, wherein the probe request message comprises the hash value;

determining that the hash value within the probe request is a valid SSID based on the hash of the SSID of the wireless network stored in the storage device; and controlling the network interface to transmit a probe response with a plain text name of the SSID to the network device in response to the determination.

13. The computer-readable storage medium of claim 12, wherein the processor performs receiving a confirmation message from the network device which confirms the validation of the name of the SSID from the network device, and in response, establishing a network session between the apparatus and the network device.

14. The computer-readable storage medium of claim 12, wherein the apparatus comprises an access point (AP) of the wireless network and the method further comprises listening for probe requests via an active scanning process performed between the network device and the AP.

15. The computer-readable storage medium of claim 12, wherein the processor performs determining that the hash value is a valid SSID by matching the hash value to a hash value within a list of hash values stored in the stored device which correspond to a plurality of valid SSIDs of the wireless network.

* * * * *